US011574498B2

(12) United States Patent
Maillard et al.

(10) Patent No.: US 11,574,498 B2
(45) Date of Patent: Feb. 7, 2023

(54) BIOMETRIC CAPTURE DEVICE

(71) Applicant: Idemia Identity & Security France, Courbevoie (FR)

(72) Inventors: Sylvain Maillard, Courbevoie (FR); Denis Dumont, Courbevoie (FR); Olivier Poitelon, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 17/806,634

(22) Filed: Jun. 13, 2022

(65) Prior Publication Data
US 2022/0406089 A1 Dec. 22, 2022

(30) Foreign Application Priority Data

Jun. 18, 2021 (FR) ....................................... 2106506

(51) Int. Cl.
*G06V 40/13* (2022.01)
*G02B 5/04* (2006.01)
(52) U.S. Cl.
CPC ...... *G06V 40/1324* (2022.01); *G06V 40/1318* (2022.01); *G02B 5/045* (2013.01)
(58) Field of Classification Search
CPC . G06V 40/1324; G06V 40/1318; G02B 5/045
See application file for complete search history.

(56) References Cited

U.S. PATENT DOCUMENTS

| 2005/0271258 A1 | 12/2005 | Rowe |
| 2006/0291704 A1 | 12/2006 | McClurg |
| 2008/0273771 A1* | 11/2008 | Hsieh ................. G06V 40/1324 382/127 |

OTHER PUBLICATIONS

Preliminary Research Report received for French Application No. 2106506, dated Mar. 2, 2022, 5 pages (1 page of French Translation Cover Sheet and 4 pages of original document).

* cited by examiner

*Primary Examiner* — Abhishek Sarma
(74) *Attorney, Agent, or Firm* — Womble Bond Dickinson (US) LLP

(57) ABSTRACT

A biometric capture device having an optical block integrating an acquisition surface, an optical acquisition system arranged so that a first light ray propagating, outside the optical block, along an optical axis of the said optical acquisition system forms at the level of the acquisition surface, an angle with respect to a normal to the acquisition surface of a value greater than a critical angle depending on the refractive indices of the optical block and of the air, the optical system also being arranged so that the optical axis forms an angle with respect to a normal to the exit face less than said critical angle, an illumination system configured to provide illumination of the acquisition surface, the illumination system generating a light beam defined by an illumination axis, a second light ray propagating along the illumination axis out of the optical block.

15 Claims, 4 Drawing Sheets

[Fig. 1]
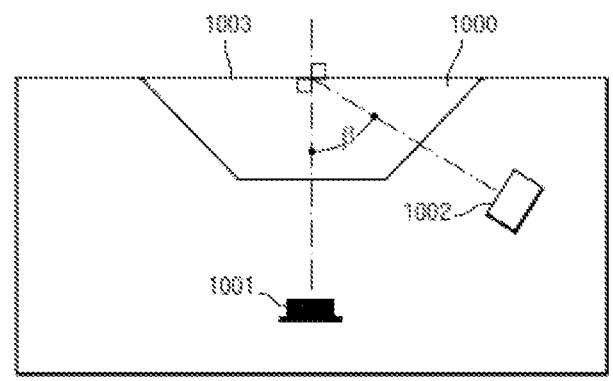
[Fig. 2]
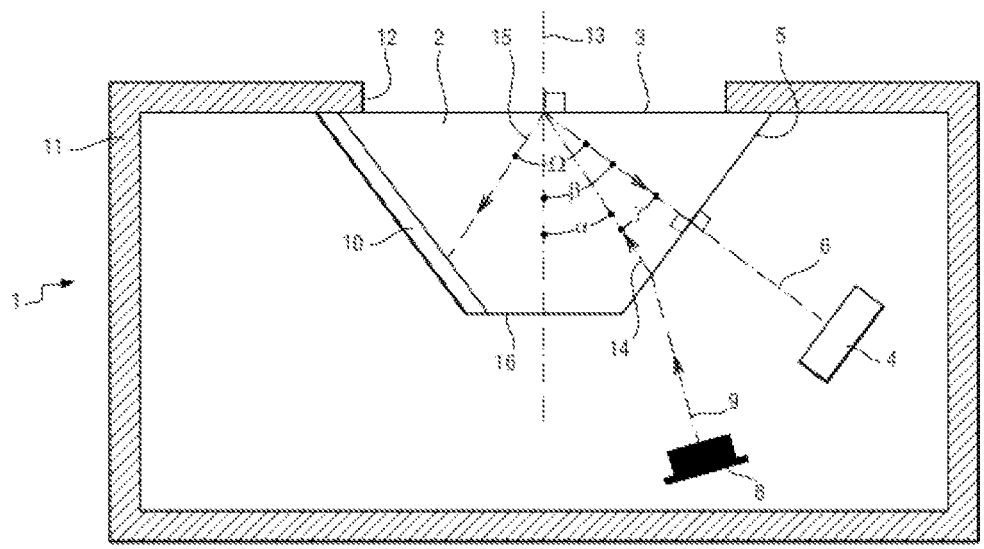

[Fig. 3]
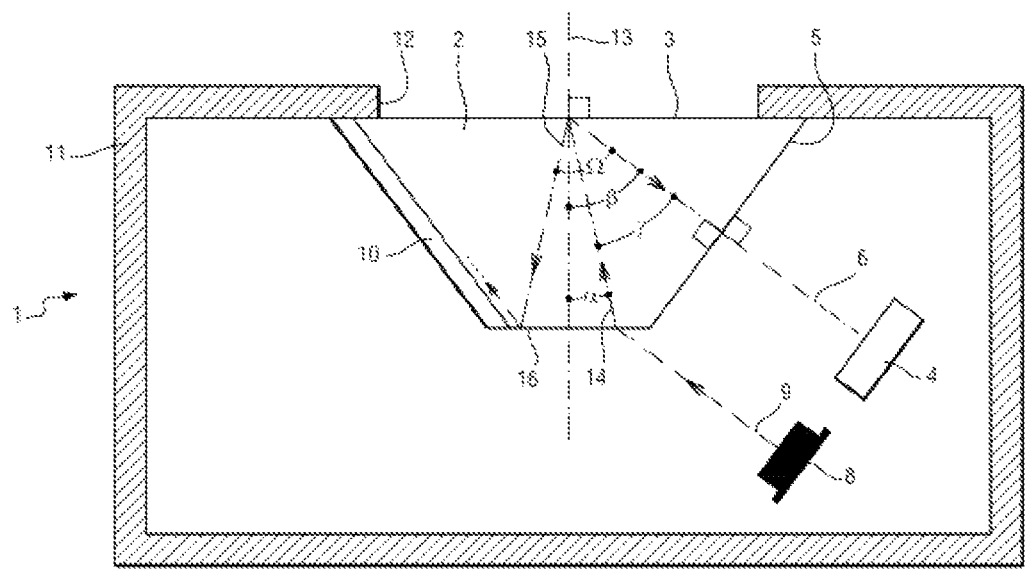
[Fig. 4]
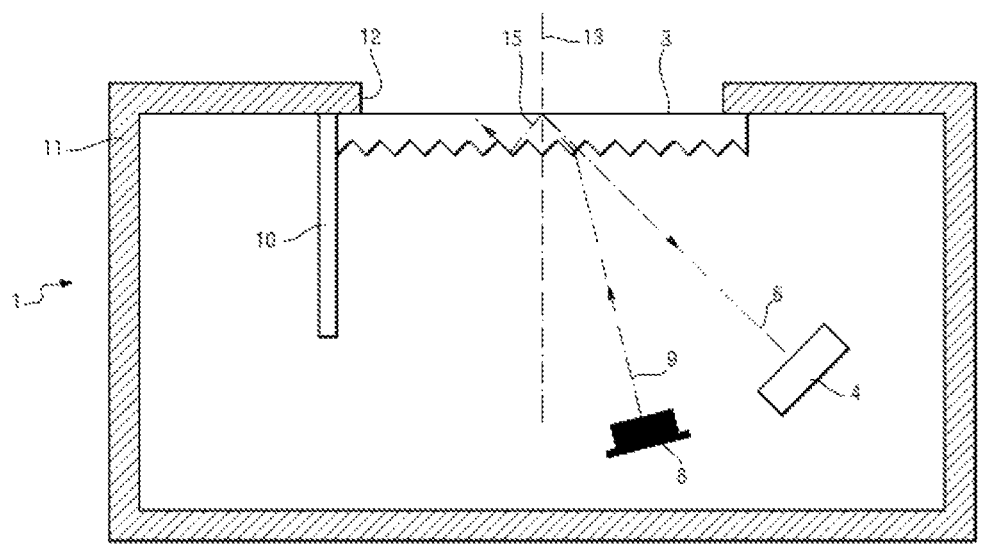

[Fig. 5]
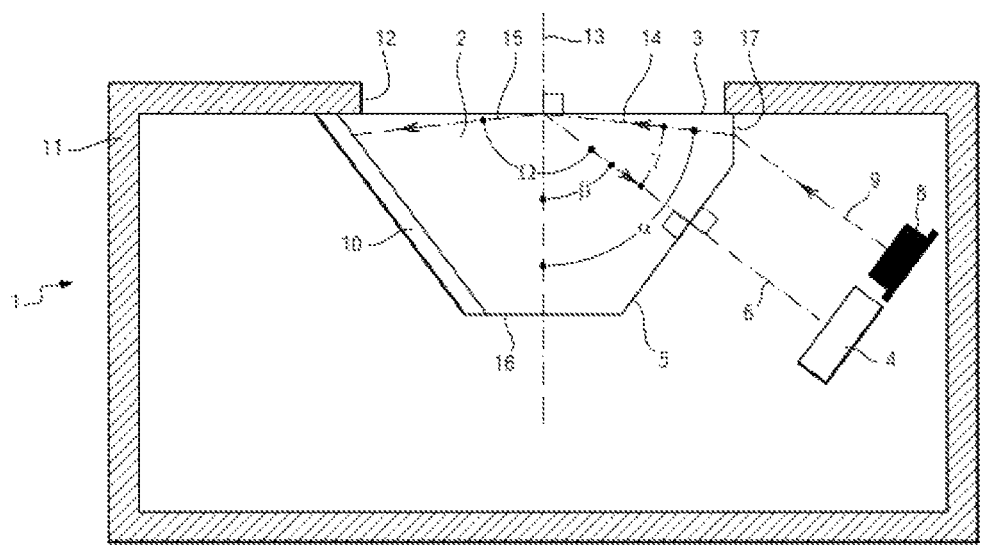
[Fig. 6]
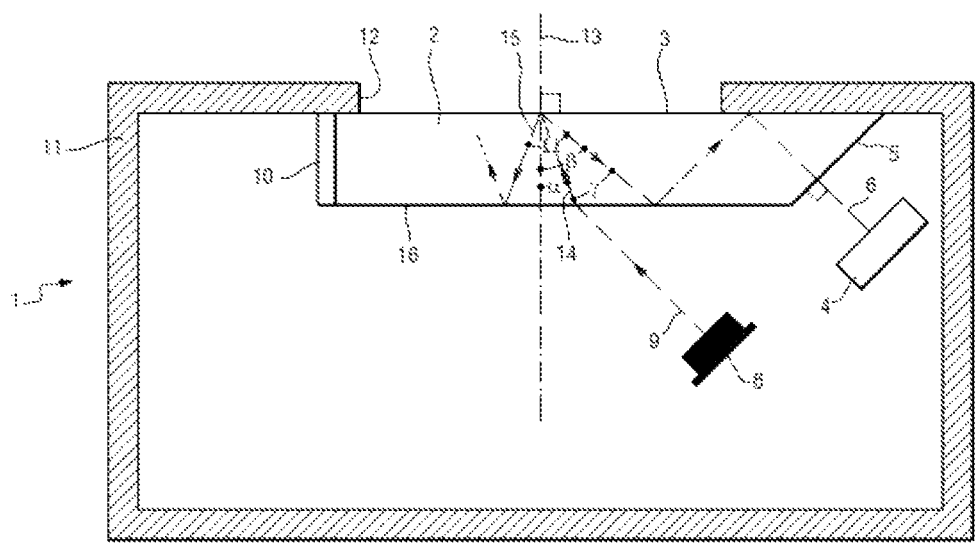

[Fig. 7]
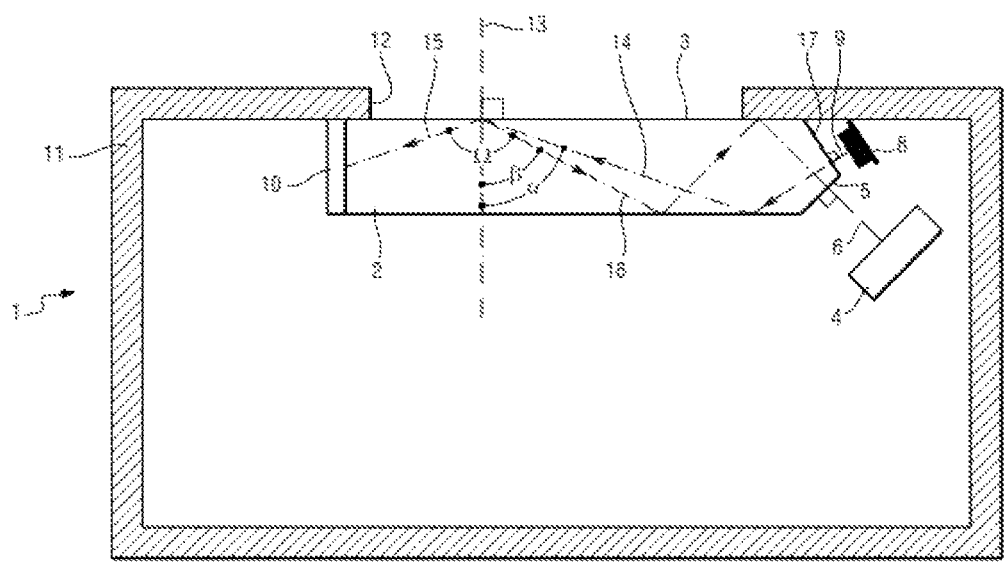
[Fig. 8]
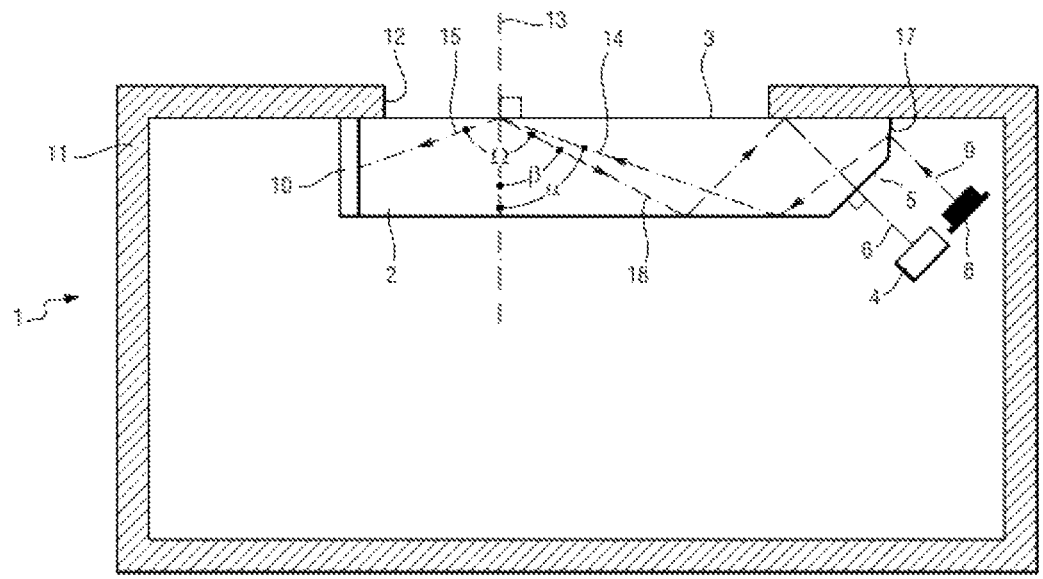

BIOMETRIC CAPTURE DEVICE

CROSS-REFERENCE TO RELATED APPLICATIONS

This application claims priority pursuant to 35 U.S.C. 119(a) to France Patent Application No. 2106506, filed Jun. 18, 2021, which application is incorporated herein by reference in its entirety.

DESCRIPTION

The present invention relates to the field of biometric recognition, for example for the purpose of identifying an individual or verifying the individual's right to access a place, object or information.

BACKGROUND OF THE INVENTION

Usually, a biometric recognition process consists in comparing, on the one hand, biometric data extracted from a captured image of a body part of a recognition candidate and, on the other hand, reference biometric data extracted from an image of the same body part of a previously referenced user, in order to validate or refuse the recognition.

There are biometric capture devices comprising a box provided with an acquisition surface on which the applicant affixes one of their fingers, and a camera arranged in the box to take one or more images of said finger in order to allow the launch of the biometric recognition process.

FIG. 1 shows a typical arrangement of a biometric capture device comprising a glass or transparent plastic prism 1000, an illumination system 1001 and an optical acquisition system comprising a camera 1002.

The camera 1002 is associated with a side face of the prism 1000 and the illumination system 1001 with the small base of the prism 1000 opposite the large base of the prism in which the acquisition surface 1003 is inscribed.

In operation, the illumination system 1001 generates a light beam that passes through the small base of the prism until it reaches the acquisition surface 1003 and exits the device. The acquisition surface 1003 is thus an interface between a first medium (corresponding to the prism) and a second medium (corresponding to the air or the user's finger).

The individual light rays of the illumination beam diverge in a distributed manner around a main illumination axis that has an angle with the normal to the acquisition surface that is small, equal to 0° in the case of FIG. 1. The divergence of the light rays around the main illumination axis is such that the entire acquisition surface 1003 is illuminated. The divergence is for example 200 at most.

The rays emitted by the illumination system 1001 are refracted by the small base and thus form an angle with the normal to the large base smaller than a critical angle $\theta_c$, the critical angle $\theta_c$ being defined as the angle beyond which the phenomenon of total reflection occurs when a ray reaches an interface between a first medium which is the prism and a second medium which is the air.

Thus, the majority of the rays pass through the acquisition surface 1003, whether the external medium is air or the finger, since the finger has a greater index than air, when the finger is placed on the acquisition surface.

When the finger is placed on the acquisition surface 1003, the rays generated by the illumination system 1001 and striking the acquisition surface are therefore not totally reflected by this surface and illuminate the finger. The rays are then scattered inside the finger and re-emitted in all directions with the same luminous intensity: the finger behaves like a Lambertian surface or isotropically.

However, the camera 1002 is arranged so that it can only receive light rays forming an angle relative to the normal to the large base greater than the critical angle $\theta_c$. It is also arranged to receive only rays forming an angle with the normal to the acquisition surface 1003 smaller than a limit angle $\theta_l$, the critical angle $\theta_l$ being defined as the angle beyond which the phenomenon of total reflection occurs when a ray reaches an interface between a first medium which is the prism and a second medium which is the finger.

Consequently, the light rays scattered by the finger and coming out of the finger at the valleys cannot reach the camera 1002 because, as they pass through the layer of air separating them from the acquisition surface and then are refracted by said surface, they necessarily propagate in the prism forming an angle with respect to the normal to said surface smaller than the critical angle $\theta_c$.

On the other hand, rays scattered by the finger and exiting the finger at the ridges of the finger in contact with the acquisition surface 1003 can propagate through the prism at any angle with respect to the normal to the acquisition surface 1003 less than $\theta_l$. Thus, there are rays emitted by the finger propagating in the prism at angles with respect to the normal to the acquisition surface 1003 greater than $\theta_c$ that can be imaged by the camera.

As a result, the camera 1002 forms a high-contrast fingerprint image between valleys and ridges since:
  the ridges of the image correspond to light rays scattered by the finger which have emerged from the finger at the level of the ridges in contact with the acquisition surface 1003 to reach the camera, and
  the light rays scattered by the finger that came out of the finger at the level of the valleys could not reach the camera.

The ridges therefore appear brighter in the imprint image than the valleys.

Such a device is called "frustrated total reflection" because of the relative position between the camera 1002 and the large base, implying that the camera observes the acquisition surface in a total reflection condition in the absence of a finger in contact with the acquisition surface: indeed, any ray reaching the camera from the acquisition surface has already been reflected against the acquisition surface 1003 and was therefore already propagating in the prism before that reflection, but no ray can cross the acquisition surface and reach the camera because of the air being in contact with the acquisition surface 1003. When the finger touches the acquisition surface 1003, however, the condition that the camera observes the acquisition surface 1003 in total reflection is temporarily no longer met, since rays can pass from the finger to the camera, hence the term "frustrated total reflection".

Unfortunately, this type of device remains sensitive to grime and scratches on the acquisition surface. This is because some of the light rays from the illumination system may be scattered by this grime and then propagate at an angle to the normal to the acquisition surface 1003 greater than the critical angle $\theta_c$ and reach the camera.

The path of the rays can then be modeled by anisotropic reflection and scattering. This can be modeled for example by the Henyey-Greenstein phase function. The probability that the angle between the reflected geometric ray and the real ray is $\theta$ is:

$$P(\mu) = \frac{\frac{1}{4\pi}(1-g^2)}{(1+g^2-2g\mu)^{\frac{3}{2}}}, \text{ with } \mu = \cos(\theta),$$

Where g is the anisotropy coefficient, greater than 0 and less than 1. For light soiling, it will be close to 1 and will decrease with the amount of deposit on the surface.

Experimentally, a value always greater than 0.5 was observed.

This results in a decreasing energy profile when moving away from the geometric reflection condition.

This is particularly bothersome when the grime comes from traces left by a finger previously applied to the surface, as an image similar to the image of that finger may appear.

Therefore, it was considered to increase the detection thresholds of the device so that the device would not take into account the print traces left by the previous candidates.

Unfortunately, at this point it sometimes happens that the device no longer takes into account a real print of a new candidate placing their finger on the acquisition surface. This is the case, for example, if the user applies a "dry finger", that is a finger for which the optical coupling is limited and only a fraction of the rays emitted by the finger cross the acquisition surface.

SUBJECT MATTER OF THE INVENTION

One purpose of the invention is to provide a biometric capture device that can more easily differentiate a real print of an authentication candidate from residual prints remaining on the acquisition surface.

SUMMARY OF THE INVENTION

In order to achieve this goal, according to the invention, a biometric capture device is proposed comprising:
- an optical block integrating an acquisition surface on which a user, when the surface is in use, places at least one body part bearing at least one print,
- an optical acquisition system configured to acquire at least one image of at least one print of said body part through at least one face of the block known as the exit face, the optical system being arranged so that a first light ray propagating, outside the optical block, along an optical axis of the said optical acquisition system forms at the level of the acquisition surface, an angle β with respect to a normal to the acquisition surface of a value greater than a critical angle depending on the refractive indices of the optical block and of the air, the optical system also being arranged so that the optical axis forms an angle with respect to a normal to the exit face smaller than said critical angle,
- an illumination system configured to provide illumination of the acquisition surface, the illumination system generating a light beam defined by an illumination axis,
- a second light ray propagating along the illumination axis out of the optical block, then propagates in the optical block to form a given incident ray at the level of the acquisition surface, and that given incident ray is reflected on the acquisition surface to thus define a given reflected ray,
the illumination system and the optical acquisition system being arranged so that an angle Ω between:
the reflected ray, if the reflected ray belongs to a plane defined by the normal to the acquisition surface and the first ray, or the projection of the reflected ray in said plane in the opposite case, and
the first ray is strictly greater than the angle β.

Thus in use, the light beam generated by the illumination system crosses at least one of the faces of the optical block until it reaches the acquisition surface. When the body part is placed on the acquisition surface, the fraction of the light rays of the light beam (extending along the illumination axis or parallel to it when propagating out of the optical block) and striking the acquisition surface at the place where the body part is affixed and which are reflected by said acquisition surface, do not reach the optical acquisition system because these rays are directed away from the exit face by virtue of the particular arrangement between the illumination system and the optical acquisition system.

Furthermore, the light rays (extending along the illumination axis or parallel to it when they propagate outside the optical block) and striking the acquisition surface at the place where the ridges of the body part are affixed, and/or the light rays crossing the acquisition surface at the place where the valleys are affixed and thus reaching the finger, will be scattered isotropically by said body part.

However, due to the particular position of the optical acquisition system, said system can only receive light rays forming an incident angle with respect to the normal to the acquisition surface greater than the critical angle $\theta_c$. As a result, light rays scattered by the body part and exiting the body part at the valleys cannot normally reach the optical acquisition system because they cannot normally pass through the layer of air separating them from the acquisition surface and then propagate into the optical block while forming an incident angle with respect to the normal to the acquisition surface greater than the critical angle $\theta_c$.

Thus, only the light rays scattered by the body part and coming out of the finger at the level of the ridges can normally reach, for at least some of them, the optical acquisition system.

As a consequence, the optical acquisition system forms a high-contrast image of the print between valleys and ridges since:
the ridges of the image correspond to light rays scattered by the body part which have emerged from the body part, at the level of the ridges of said body part which are in contact with the acquisition surface, to reach the optical acquisition system, and
the light rays scattered by the body part which came out of the body part at the level of the valleys could not reach normally the optical acquisition system.

The ridges therefore appear lighter than the valleys on the images.

The invention thus makes it possible to acquire a good quality print image.

The scattering of the rays by the body part being isotropic, the particular arrangement of the illumination system compared to the positioning of the illumination systems of the background art does not modify the scattering of the light rays by the body part and consequently does not modify the quantity of light scattered by the body part and reaching the optical acquisition system.

On the other hand, in the case of a residual print, the light rays scattered by the grime left on the acquisition surface will be scattered non-isotropically.

Indeed, the angle Ω is greater in the invention than in the devices of the prior art due to the particular arrangement between the optical acquisition system and the illumination system. However, the non-isotropic scattering by grime left on the acquisition surface follows a rapidly decreasing energy profile when moving away from the geometrical reflection (in the present case of the given reflected ray, or its projection): as a consequence, the intensity of the light rays scattered by the body part towards the optical acquisition system is reduced in the invention relative to devices of the background art.

Thus, in a given image, the luminous intensity of the points corresponding to the ridges of a body part placed on the acquisition surface is not modified in the invention relative to the devices of the prior art, whereas the luminous intensity of the points corresponding to the residual traces present on the acquisition surface is reduced in the invention with respect to the devices of the background art.

As a result, the invention will have little or no susceptibility to a residual print during a capture application because it will only receive very low-intensity light rays from it.

A simple threshold on the detection level of the invention makes it possible to remove the residual traces without altering the images of the body parts placed on to the acquisition surface.

The invention thus makes it easier to differentiate residual prints from a real print of a candidate for authentication by advantageously relying on the different optical properties of a residual print and a real print (the human body being very diffusive, it is not very sensitive to the direction in which light rays strike it, unlike a much finer residual print) as well as the principle of total reflection, and more particularly the principle of frustrated total reflection.

The invention thus proposes a simple solution to enable the biometric acquisition device to better differentiate between residual and real prints, in particular to make residual prints less visible in the images.

Furthermore, the invention can be implemented in boxes of the background art without having to modify the generally complex optical acquisition system, instead only changing the illumination system so that it illuminates the acquisition surface at an angle with respect to the normal to said surface such that the angle $\Omega$ is greater than the angle $\beta$.

We note that the illumination system is such that the given incident ray is inclined with respect to the normal to the acquisition surface, that is the given incident ray is strictly greater than zero degrees and strictly less than 90 degrees.

We note that the optical acquisition system is such that the first ray is inclined with respect to the normal to the acquisition surface, that is the first ray is strictly greater than zero degrees and strictly less than 90 degrees.

"Acquisition surface" is understood to mean the portion of a device with which a candidate for biometric recognition will interact to ensure the taking of an image.

At least a part of the surface of the optical block can directly form said acquisition surface or be covered by a treatment and/or a dedicated element then forming, together with said part of the surface of the optical block, said acquisition surface.

Most often the acquisition surface corresponds to only a part of the surface of the acquisition block (covered or not by a treatment and/or a dedicated element). For example, an upper face of the acquisition block can be covered by a frame comprising a window; the interior of the window will delimit the acquisition surface which will thus be formed by only a portion of the upper face of the optical block.

Note that the given reflected ray can also be called symmetrical to the given incident ray with respect to the normal to the acquisition surface.

We note that the given reflected ray is not necessarily a total reflection of the given incident ray but can be simply a partial reflection of the given incident ray.

"Optical axis" is understood to mean the axis around which the field of view of the optical acquisition system is centered.

"Illumination axis" is understood to mean the axis around which the light rays of the light beam generated by the illumination system diverge in a distributed manner. Said illumination axis can thus be the generatrix of the beam when it takes the form of a straight cylinder, or the height of the beam when it takes the form of a cone. For any other form of beam, we may consider the direction of maximum intensity of the light beam.

For the present application, the angles in connection with the illumination system are considered at the point of impact on the acquisition surface of a given light beam generated by said illumination system, that is once the beam has propagated in the optical block (except when talking about a surface other than the acquisition surface, such as for example the surface of the optical block through which the light beam enters the optical block) Thus if we consider FIG. 7 which will be described in more detail below, the angle $\alpha$ is considered at the point of impact of a given ray and not directly at the illumination system before said ray is propagated into the optical block. As a consequence, when we consider the acquisition surface, we are speaking of the incident ray rather than the illumination axis of the illumination system, which may, for example, undergo a slight refraction at the entrance to the optical block.

In the same way, the angles in connection with the optical acquisition system are considered at the level of the acquisition surface, that is before the ray in question propagates in the optical block to reach the optical acquisition system (except when speaking about another surface than the acquisition surface, such as the exit face). Thus if we consider FIG. 7, which will be described in more detail below, the angle $\beta$ is considered at the level of the acquisition surface and not directly at the level of the optical acquisition system after said beam propagates into the optical block. Consequently, when we consider the acquisition surface, we are speaking of the first ray rather than the optical axis of the optical system.

For the present application, the angles are to be considered in a plane defined by the first ray and the normal to the acquisition surface: the angles are thus defined either by rays belonging to said plane or by projections of rays in said plane.

Moreover, we recall that the acquisition surface separates a first medium (corresponding to the optical block) from a second medium (corresponding to the air or the skin).

Hereafter, "critical angle $\theta_c$" is thus understood to mean the angle beyond which total reflection occurs when an incident light ray arriving through the first medium reaches the acquisition surface when the second medium is air. The critical angle is given by the following formula:

$$\theta_c = \arcsin\left(\frac{n_0}{n_1}\right)$$

$n_1$ being the refractive index of the optical block and $n_0$ being the refractive index of the air. As a consequence, for a refractive index of air equal to 1 and a refractive index of the optical block equal to for example 1.5, we obtain a critical angle $\theta_c$ of 41.8 degrees.

"Limit angle $\theta_1$" is understood to mean the angle beyond which total reflection occurs when an incident light ray arriving through the first medium reaches the acquisition surface when the second medium is the skin.

The limit angle is given by the following formula:

$$\theta_l = \arcsin\left(\frac{n_2}{n_1}\right)$$

$n_1$ being the refractive index of the optical block and $n_2$ being the refractive index of the air. The refractive index of human skin is, in the visible range, between 1.41 and 1.47. Considering the minimum value of 1.41, this gives a limit angle $\theta_l$ of 70 degrees. Considering the maximum value, this gives a limit angle $\theta_l$ of 76 degrees.

Optionally, the exit face is a side face of the optical block.

Optionally, the optical system is arranged so that its optical axis makes an angle with the normal to the exit face of less than two degrees, preferentially less than one degree, and preferentially zero degrees.

Optionally, the angle $\Omega$ is greater than 60 degrees (°) and preferentially greater than 70° and most preferentially greater than 90°.

Optionally, the angle $\Omega$ is less than 2β.

Optionally, the angle $\Omega$ is greater than 70° and less than 2β.

Optionally, the angle $\Omega$ is greater than 90° and greater than 2β.

Optionally, the illumination system and the optical acquisition system are arranged so that an angle γ between the first ray and the given incident ray is strictly less than β.

Optionally the angle γ is less than 35 degrees and preferably less than 25 degrees and more preferably less than 15 degrees and most preferably less than 10 degrees.

Optionally, the given incident ray forms an angle with respect to the normal to the acquisition surface of a value greater than the critical angle and less than a limit angle depending on the refractive indices of the block and the skin.

Optionally the angle between the given incident ray and the normal to the acquisition surface is greater than β.

Optionally, the device comprises a single illumination system and/or a single optical acquisition system.

Optionally, the illumination system and the optical acquisition system are carried by supports extending in coincident or parallel planes.

Optionally the optical block is shaped like a prism.

Optionally the optical block is shaped like a blade:

with parallel faces, with one side face inclined at least partially or thin, with a plurality of micro-prisms on the bottom side.

The use of a blade allows for a more compact device.

Indeed a blade is of lower height than a prism, in particular because the exit face of a blade is closer to the acquisition system than in a prism which allows the exit face to be smaller.

Optionally, the device comprises at least one zone treated to absorb light rays emitted by the illumination system and reflected at the acquisition surface.

Optionally, said zone is treated with a dark colored coating.

Optionally the optical acquisition system and the illumination system are in close proximity to each other.

Optionally the illumination system illuminates through the exit face.

Optionally the illumination system illuminates through a face of the optical block adjacent to the exit face.

"Adjacent face" is understood to mean a face of the optical block having at least one edge in common with the exit face.

Further features and advantages of the invention will become apparent from the following description of particular non-limiting embodiments of the invention.

BRIEF DESCRIPTION OF THE DRAWINGS

FIG. 1 has already been described in connection with the background art of the invention: FIG. 1 is a schematic cross-sectional view of a device of the background art that is not part of the invention.

The invention will be better understood in the light of the following description with reference to the attached figures, among which:

FIG. 2 is a schematic cross-sectional view of a device according to a first embodiment of the invention.

FIG. 3 is a schematic cross-sectional view of a device according to a second embodiment of the invention.

FIG. 4 is a schematic cross-sectional view of a device according to a third embodiment of the invention.

FIG. 5 is a schematic cross-sectional view of a device according to a fourth embodiment of the invention.

FIG. 6 is a schematic cross-sectional view of a device according to a fifth embodiment of the invention.

FIG. 7 is a schematic cross-sectional view of a device according to a sixth embodiment of the invention.

FIG. 8 is a schematic cross-sectional view of a device according to a seventh embodiment of the invention.

DETAILED DESCRIPTION OF THE INVENTION

With reference to FIG. 2, according to a first embodiment, the biometric capture device, generally designated as 1, is a capture device for acquiring a fingerprint for biometric recognition purposes.

However, this application is not limited and the device 1 can be used to capture a print of another body part, for example multiple fingers, a whole hand, a palm, etc.

The device 1 comprises an optical block 2 with:

an upper face, a lower face parallel to the upper face, and at least one side face connecting the upper face to the lower face.

The optical block 2 is made of a material that is transparent to visible light, for example, glass or plastic such as polycarbonate (PC) or poly(methyl methacrylate) (PMMA). The optical block 2 has a refractive index greater than the refractive index of air and optionally greater than the refractive index of the skin.

In particular, the optical block 2 is here shaped like a prism. The optical block 2 is for example a prism with four side faces. The optical block 2 is for example a truncated pyramid so that it has a large base (the upper side) and a small base (the lower side).

In this case, only a portion of the upper surface forms an acquisition surface 3 on which a biometric recognition candidate places a finger. Optionally, the optical block 2 is partly surrounded by a frame 11 comprising a window 12: the interior of the window delimits the acquisition surface 3.

The acquisition surface 3 is flat.

Below, the angles are to be considered without any body parts placed on the acquisition surface.

Furthermore, the device 1 also comprises an optical acquisition system 4 configured to capture at least one image of a fingerprint of a biometric recognition candidate placed on the acquisition surface 3.

In this case, the optical acquisition system 4 is the only optical acquisition system of the device 1.

The optical acquisition system 4 comprises for example at least one optical sensor, such as a camera sensitive to light radiation in the visible range, and optionally one or more additional optical elements such as a lens or lenses and a diaphragm.

In this case, the optical acquisition system 4, and thus the device 1, has a single optical sensor.

The optical acquisition system 4 is optionally arranged to acquire the image(s) through a first of the side faces of the optical block 2, hereafter called the exit face 5. The exit face 5 is thus inclined with respect to the upper face associated with the acquisition surface 3.

In the present case, the optical acquisition system 4 is materially arranged outside the optical block behind said exit face 5 so that its field of view is directly oriented towards the exit face 5.

The field of view of the optical acquisition system 4 is defined by an optical axis 6. It is therefore noted here that the optical axis 6 is directed towards the acquisition surface and inclined with respect to a normal 13 to the acquisition surface 3 (i.e. neither parallel nor orthogonal to it).

Preferentially, the optical axis 6 forms a normal to the exit face 5. The optical axis thus forms an angle with respect to the normal to the exit face 5 that is smaller than the critical angle $\theta_c$.

The optical acquisition system 4 is further arranged so that a first ray from the acquisition surface and reaching it while propagating along the optical axis 6 forms an angle β with respect to a normal 13 to the acquisition surface 3 that is greater than the critical angle $\theta_c$ (but less than the limit angle $\theta_l$) so that, when there is air above the acquisition surface 3, no rays from outside the optical block 2 can pass through the acquisition surface 3 and into the acquisition system 4. In this case, because the optical axis 6 is orthogonal to the exit face 5 and is directed towards the acquisition surface 3, the first ray is directly confused with the optical axis 6 even when it propagates in the optical block 2. In the following, only the optical axis will be referred to in this first embodiment.

Furthermore, the device 1 comprises an illumination system 8.

In the shown example, the illumination system 8 is the sole illumination system 8 of the device 1.

The illumination system 8 comprises at least one light source arranged to emit light in the visible range.

As an alternative or in addition, the illumination system 8 and the optical acquisition system can work in other wavelength ranges and for example in the near infrared (i.e. with a wavelength of less than 1.1 micrometers) or the ultraviolet if the optical block is transparent to these wavelengths. The at least one light source of the illumination system 8 consists of one or more light-emitting diodes (LEDs) and/or one or more super luminescent diodes (SLDs) and/or one or more laser diodes.

In this case, the illumination system 8 (and thus the device 1) is limited to a single light source. In this case, the light source (and thus the illumination system 8 and thus the device 1) consists of a single LED.

The illumination system 8 therefore has a single illumination axis 9 which is that of the LED. In this case, the illumination system 8 is able to generate a light beam diverging around the illumination axis and directed towards the acquisition surface 3. The divergence is such that the entire acquisition surface 3 is illuminated. The divergence is for example 20° at most.

The illumination system 8 is here arranged to illuminate through the exit face 5. In the present case, the illumination system 8 is materially arranged outside the optical block 2 behind said exit face 5 so that the light beam it generates is directly oriented towards the exit face 5. Moreover, the illumination axis 9 is inclined with respect to the exit face 5. Consequently the light rays, forming the light beam, are refracted by this face.

As a result, a light beam propagating along the illumination axis 9, then propagates in the optical block 2 to form a given incident ray 14 at the acquisition surface 3 which is not coincident with the illumination axis 9. The given incident ray 14 forms an angle α with the normal 13.

The given incident ray 14 reflects off the acquisition surface 3, thus defining a given reflected ray 15. The illumination system 8 and the optical acquisition system 4 are furthermore arranged so that an angle Ω between the given reflected ray 15 and the optical axis 6 is strictly greater than the angle β.

In this case the angle Ω is greater than 60 degrees and is here greater than 70 degrees. The angle Ω is, for example, 75 degrees.

In this case, the angle Ω is less than 2β. β is indeed equal to 45 degrees in this case.

The illumination system 8 is arranged close to the optical acquisition system 4.

The illumination system 8 is arranged under the optical acquisition system 4. The illumination system 8 is therefore not oriented towards the optical acquisition system 4. In fact, the illumination system 8 and the optical acquisition system 4 are generally oriented in the same direction and in the same sense.

Optionally, the illumination system and the optical acquisition system are arranged so that an angle γ between the optical axis 6 and the given incident ray is strictly less than J.

Optionally the angle γ is less than 35 degrees and preferably less than 25 degrees. In this case, for example, γ is considered equal to 15 degrees (a being equal to 30 degrees).

The illumination system 8 is here arranged so that the angle α is smaller than the angle β.

The illumination system 8 is here thus arranged so that the angle α is smaller than the critical angle $\theta_c$.

Furthermore, the optical block 2 comprises at least one zone 10 treated to absorb light rays emitted by the illumination system 8 and reflected at the acquisition surface 3.

For example, said zone 10 is covered with a coating (directly by being molded-in, and/or indirectly by covering an external and/or internal side of at least one portion of at least one of the faces of the optical block 2: the treated zone 10 can thus be arranged outside and/or inside the optical block 2) absorbing at least 95% of the light rays, and preferably at least 98% of the light rays, arriving on the said zone. The coating is for example a dark-colored coating (i.e. a colored coating absorbing at least 95% of the rays, and preferably at least 98% of the rays) and for example black in color.

Optionally, said zone 10 is arranged on at least one of the side faces of the optical block 2, preferably the side face opposite the exit face 5. Preferably said zone 10 extends over at least the entirety of said side face opposite the exit face 5.

The illumination system 8 is arranged so that all the rays emitted by the illumination system 8 and reflected on the acquisition surface 3, reach the zone 10 after any number of reflections on the faces of the optical block 2.

Thus, a device 1 has been described that has an angle Ω of 75°: with an anisotropy factor g greater than 0.6, the attenuation of the luminous intensity of the light rays scattered by the residual indentations by virtue of the device 1 is greater than a factor of 3 compared to a background art device such as the one shown in FIG. 1. For example, for an anisotropy factor g of 0.7, the attenuation is 5 times greater with the device 1 than with the background art device shown in FIG. 1.

Of course, the device 1 shown in FIG. 1 is only one of many possible arrangements for implementing the invention.

FIG. 3 thus shows another arrangement which is identical to that of FIG. 2 except that instead of illuminating through the exit face 5, the illumination system 8 illuminates through a face of the optical block adjacent to said exit face 5. In this case, the illumination system 8 illuminates through the bottom side 16.

The rest of what has been said for the first embodiment is therefore also applicable to the second embodiment in particular with respect to the angles α, β, γ and Ω.

Furthermore, the illumination system 8 is cleverly arranged so that its illumination axis 9 is parallel to the optical axis 6.

Preferably, the illumination system 8 and the optical acquisition system 4 are further arranged so that their respective bases lie in the same plane.

Typically, the illumination system 8 and the optical acquisition system 4 are mounted on the same support or on two separate supports that are parallel to each other and optionally extend in the same plane.

FIG. 4 shows another arrangement which is identical to that of FIG. 2 except for the optical block 2.

The optical block 2 is thus a so-called thin blade having:
an upper face,
a lower face parallel to the upper face, and
at least one side face connecting the upper face to the lower face (at least one side face connecting the upper face to the lower face being orthogonal to the lower face and the upper face).

The optical block 2 is made of a material that is transparent to visible light, for example, glass or plastic such as polycarbonate (PC) or poly(methyl methacrylate) (PMMA). The optical block 2 has a refractive index greater than the refractive index of air and optionally greater than the refractive index of the skin.

In this case, only a portion of the upper surface forms an acquisition surface 3 on which a biometric recognition candidate places a finger. Optionally, the optical block 2 is partly surrounded by a frame 11 comprising a window 12: the interior of the window delimits the acquisition surface 3.

The acquisition surface 3 is flat.

On the other hand, the lower face 16 of the optical block 2 is not flat but has a plurality of micro-prisms on the external side of the optical block.

Thus, there is no longer a single exit face and a single face through which the illumination system 8 illuminates, but a multitude of exit faces and a multitude of faces through which the illumination system 8 illuminates.

However, given the particular structure of a thin microprism blade, the behavior of the light rays will be the same as for the first embodiment if one is positioned individually at each exit face of one of the given micro-prisms.

The rest of what has been said for the first embodiment is consequently also applicable to the third embodiment in particular with respect to the angles α, β, γ and Ω.

With reference to FIG. 5, according to a fourth embodiment, the biometric capture device, generally designated as 1, is a capture device for acquiring a fingerprint for biometric recognition purposes.

However, this application is not limited and the device 1 can be used to capture a print of another body part, for example multiple fingers, a whole hand, a palm, etc.

The device 1 comprises an optical block 2 with:
an upper face,
a lower face parallel to the upper face, and
at least one side face connecting the upper face to the lower face.

The optical block 2 is made of a material that is transparent to visible light, for example, glass or plastic such as polycarbonate (PC) or poly(methyl methacrylate) (PMMA). The optical block 2 has a refractive index greater than the refractive index of air and optionally greater than the refractive index of the skin.

In particular, the optical block 2 is here shaped like a prism.

In this case, only a portion of the upper surface forms an acquisition surface 3 on which a biometric recognition candidate places a finger. Optionally, the optical block 2 is partly surrounded by a frame 11 comprising a window 12: the interior of the window delimits the acquisition surface 3.

The acquisition surface 3 is flat.

Below, the angles are to be considered without any body parts placed on the acquisition surface.

Furthermore, the device 1 also comprises an optical acquisition system 4 configured to capture at least one image of a fingerprint of a biometric recognition candidate placed on the acquisition surface 3.

In this case, the optical acquisition system 4 is the only optical acquisition system of the device 1.

The optical acquisition system 4 comprises for example at least one optical sensor, such as a camera sensitive to light radiation in the visible range, and optionally one or more additional optical elements such as a lens or lenses and a diaphragm.

In this case, the optical acquisition system 4, and thus the device 1, has a single optical sensor.

The optical acquisition system 4 is optionally arranged to acquire the image(s) through a first of the side faces of the optical block 2, hereafter called the exit face 5. The exit face 5 is thus inclined with respect to the upper face associated with the acquisition surface 3.

In the present case, the optical acquisition system 4 is materially arranged outside the optical block behind said exit face 5 so that its field of view is directly oriented towards the exit face 5.

The field of view of the optical acquisition system 4 is defined by an optical axis 6. It is therefore noted here that the optical axis 6 is directed towards the acquisition surface and inclined with respect to a normal 13 to the acquisition surface 3 (i.e. neither parallel nor orthogonal to it).

Preferentially, the optical axis 6 forms a normal to the exit face 5. The optical axis thus forms an angle with respect to the normal to the exit face 5 that is smaller than the critical angle $\theta_c$.

The optical acquisition system 4 is further arranged so that a first ray from the acquisition surface and reaching it while propagating along the optical axis 6 forms an angle β with respect to a normal 13 to the acquisition surface 3 that is greater than the critical angle $\theta_c$ (but less than the limit angle $\theta_l$) so that, when there is air above the acquisition surface 3, no rays from outside the optical block 2 can pass through the acquisition surface 3 and into the acquisition system 4. In this case, because the optical axis 6 is orthogonal to the exit face 5 and is directed towards the acquisition surface 3, the first ray is directly confused with the optical axis 6 even when it propagates in the optical block 2. In the following, only the optical axis will be referred to in this first embodiment.

Furthermore, the device 1 comprises an illumination system 8.

In the shown example, the illumination system 8 is the sole illumination system 8 of the device 1.

The illumination system 8 comprises at least one light source arranged to emit light in the visible range.

As an alternative or in addition, the illumination system 8 and the optical acquisition system can work in other wavelength ranges and for example in the near infrared (i.e. with a wavelength of less than 1.1 micrometers) or the ultraviolet if the optical block is transparent to these wavelengths. The at least one light source of the illumination system 8 consists of one or more light-emitting diodes (LEDs) and/or one or more super luminescent diodes (SLDs) and/or one or more laser diodes.

In this case, the illumination system 8 (and thus the device 1) is limited to a single light source. In this case, the light source (and thus the illumination system 8 and thus the device 1) consists of a single LED.

The illumination system 8 therefore has a single illumination axis 9 which is that of the LED. In this case, the illumination system 8 is able to generate a light beam diverging around the illumination axis and directed towards the acquisition surface 3. The divergence is such that the entire acquisition surface 3 is illuminated. The divergence is for example 20° at most.

The illumination system 8 is here arranged to illuminate through a face of the optical block adjacent to the exit face 5. In this case, the illumination system 8 illuminates through a face 17 connecting the exit face 5 to the upper face of the optical block 2, the exit face 5 itself connecting the face 17 to the lower face of the optical block. As a result, on the side of the illumination system 8 and the optical acquisition system 4, the optical block 2 has two side faces between its top and lower faces. The face 17 here extends orthogonally to the upper side of the optical block 2, unlike the exit face 5.

In the present case, the illumination system 8 is materially arranged outside the optical block 2 behind said face 17 so that the light beam it generates is directly oriented towards the face 17. Moreover, the illumination axis 9 is inclined with respect to the face 17. As a result, the light rays, forming the light beam, are refracted by this face 17.

As a result, a light beam propagating along the illumination axis 9, then propagates in the optical block 2 to form a given incident ray 14 at the acquisition surface 3 which is not coincident with the illumination axis 9. The given incident ray 14 forms an angle α with the normal 13.

The given incident ray 14 reflects off the acquisition surface 3, thus defining a given reflected ray 15. The illumination system 8 and the optical acquisition system 4 are furthermore arranged so that an angle Ω between the given reflected ray 15 and the optical axis 6 is strictly greater than the angle β.

In this case the angle Ω is greater than 60 degrees and is here greater than 70 degrees and is here greater than 90 degrees. The angle Ω is, for example, 105 degrees.

In this case, the angle Ω is greater than 2β. β is indeed equal to 45 degrees in this case.

The illumination system 8 is arranged close to the optical acquisition system 4.

The illumination system 8 is arranged above the optical acquisition system 4. The illumination system 8 is therefore not oriented towards the optical acquisition system 4. In fact, the illumination system 8 and the optical acquisition system 4 are generally oriented in the same direction and in the same sense.

Optionally, the illumination system and the optical acquisition system are arranged so that an angle γ between the optical axis 6 and the given incident ray is strictly less than β.

Optionally the angle γ is less than 35 degrees and preferably less than 25 degrees. In this case, for example, γ is considered equal to 15 degrees (α being equal to 60 degrees).

The illumination system 8 is here arranged so that the angle α is greater than the angle β.

The illumination system 8 is thus arranged here so that the angle α is greater than the critical angle $\theta_c$ (but of course remains less than the limit angle $\theta_l$).

Furthermore, the illumination system 8 is cleverly arranged so that its illumination axis 9 is parallel to the optical axis 6.

Preferably, the illumination system 8 and the optical acquisition system 4 are further arranged so that their respective bases lie in the same plane.

Typically, the illumination system 8 and the optical acquisition system 4 are mounted on the same support or on two separate supports that are parallel to each other and optionally extend in the same plane.

Furthermore, the optical block 2 comprises at least one zone 10 treated to absorb light rays emitted by the illumination system 8 and reflected at the acquisition surface 3.

For example, said zone 10 is covered with a coating (directly by being molded-in, and/or indirectly by covering an external and/or internal side of at least one portion of at least one of the faces of the optical block 2: the treated zone 10 can thus be arranged outside and/or inside the optical block 2) absorbing at least 95% of the light rays, and preferably at least 98% of the light rays, arriving on the said zone. The coating is for example a dark-colored coating (i.e. a colored coating absorbing at least 95% of the rays, and preferably at least 98% of the rays) and for example black in color.

Optionally, said zone 10 is arranged on at least one of the side faces of the optical block 2 and preferably here the side face opposite the exit face 5 and the face 17 (on this side of the optical block 2, the optical block 2 thus comprises only one side face connecting the upper face and the lower face). Preferably said zone 10 extends over at least the entirety of said opposite side face.

The illumination system 8 is arranged so that all the rays emitted by the illumination system 8 and reflected on the acquisition surface 3, reach the zone 10 after any number of reflections on the faces of the optical block 2.

Thus, a device 1 has been described that has an angle Ω of 105°: with an anisotropy factor g greater than 0.6, the attenuation of the luminous intensity of the light rays scattered by the residual indentations by virtue of the device 1 is at least greater than a factor 3 compared to a background art device such as the one shown in FIG. 1.

FIG. 6 shows another arrangement which is identical to that of FIG. 3 except for the optical block 2.

The optical block 2 is thus a so-called thin blade having:
an upper face,
a lower face parallel to the upper face, and
at least one side face connecting the upper face to the lower face, said face extending in an inclined manner between the upper face and the lower face. This face forms the exit face 5.

At least one other of the side faces also extends orthogonally to the lower and upper faces.

The optical block 2 is made of a material that is transparent to visible light, for example, glass or plastic such as polycarbonate (PC) or poly(methyl methacrylate) (PMMA). The optical block 2 has a refractive index greater than the refractive index of air and optionally greater than the refractive index of the skin.

In this case, only a portion of the upper surface forms an acquisition surface 3 on which a biometric recognition candidate places a finger. Optionally, the optical block 2 is partly surrounded by a frame 11 comprising a window 12: the interior of the window delimits the acquisition surface 3.

The acquisition surface 3 is flat.

Moreover, because the optical block 2 is shaped like a blade, it is possible that the first ray is reflected one or more times before propagating out of the optical block 2 along the optical axis 6.

Apart from that, what has been said for the second embodiment is therefore also applicable to the fifth embodiment in particular with respect to the angles α, β, γ and Ω.

With reference to FIG. 7, according to a sixth embodiment, the biometric capture device, generally designated as 1, is a capture device for acquiring a fingerprint for biometric recognition purposes.

However, this application is not limited and the device 1 can be used to capture a print of another body part, for example multiple fingers, a whole hand, a palm, etc.

The device 1 comprises an optical block 2 with:
an upper face,
a lower face parallel to the upper face, and
at least one side face connecting the upper face to the lower face.

The optical block 2 is made of a material that is transparent to visible light, for example, glass or plastic such as polycarbonate (PC) or poly(methyl methacrylate) (PMMA). The optical block 2 has a refractive index greater than the refractive index of air and optionally greater than the refractive index of the skin.

In particular, the optical block 2 is here shaped like a so-called thin blade.

In this case, only a portion of the upper surface forms an acquisition surface 3 on which a biometric recognition candidate places a finger.

Optionally, the optical block 2 is partly surrounded by a frame 11 comprising a window 12: the interior of the window delimits the acquisition surface 3.

The acquisition surface 3 is flat.

Below, the angles are to be considered without any body parts placed on the acquisition surface.

Furthermore, the device 1 also comprises an optical acquisition system 4 configured to capture at least one image of a fingerprint of a biometric recognition candidate placed on the acquisition surface 3.

In this case, the optical acquisition system 4 is the only optical acquisition system of the device 1.

The optical acquisition system 4 comprises for example at least one optical sensor, such as a camera sensitive to light radiation in the visible range, and optionally one or more additional optical elements such as a lens or lenses and a diaphragm.

In this case, the optical acquisition system 4, and thus the device 1, has a single optical sensor.

The optical acquisition system 4 is optionally arranged to acquire the image(s) through a first of the side faces of the optical block 2, hereafter called the exit face 5. The exit face 5 is thus inclined with respect to the upper face associated with the acquisition surface 3.

In the present case, the optical acquisition system 4 is materially arranged outside the optical block behind said exit face 5 so that its field of view is directly oriented towards the exit face 5.

The field of view of the optical acquisition system 4 is defined by an optical axis 6.

Preferentially, the optical axis 6 forms a normal to the exit face 5. The optical axis thus forms an angle with respect to the normal to the exit face 5 that is smaller than the critical angle $\theta_c$.

The optical acquisition system 4 is further arranged so that a first ray 18 from the acquisition surface and reaching it while propagating along the optical axis 6 forms an angle β with respect to a normal 13 to the acquisition surface 3 that is greater than the critical angle $\theta_c$ (but less than the limit angle $\theta_l$) so that, when there is air above the acquisition surface 3, no rays from outside the optical block 2 can pass through the acquisition surface 3 and into the acquisition system 4.

Because the optical block 2 is shaped like a blade, it is possible that the first ray 18 is reflected one or more times before propagating out of the optical block 2 along the optical axis 6.

The first ray 18 is directed towards the acquisition surface and inclined with respect to a normal 13 to the acquisition surface 3 (i.e. neither parallel nor orthogonal to it).

Furthermore, the device 1 comprises an illumination system 8.

In the shown example, the illumination system 8 is the sole illumination system 8 of the device 1.

The illumination system 8 comprises at least one light source arranged to emit light in the visible range.

As an alternative or in addition, the illumination system 8 and the optical acquisition system can work in other wavelength ranges and for example in the near infrared (i.e. with a wavelength of less than 1.1 micrometers) or the ultraviolet if the optical block is transparent to these wavelengths. The at least one light source of the illumination system 8 consists of one or more light-emitting diodes (LEDs) and/or one or more super luminescent diodes (SLDs) and/or one or more laser diodes.

In this case, the illumination system 8 (and thus the device 1) is limited to a single light source. In this case, the light source (and thus the illumination system 8 and thus the device 1) consists of a single LED.

The illumination system 8 therefore has a single illumination axis 9 which is that of the LED. In this case, the illumination system 8 is able to generate a light beam diverging around the illumination axis and directed towards the acquisition surface 3. The divergence is such that the entire acquisition surface 3 is illuminated. The divergence is for example 20° at most.

The illumination system 8 is here arranged to illuminate through a face of the optical block adjacent to the exit face 5. In this case, the illumination system 8 illuminates through a face 17 connecting the exit face 5 to the upper face of the optical block 2, the exit face 5 itself connecting the face 17 to the lower face of the optical block. As a result, on the side of the illumination system 8 and the optical acquisition system 4, the optical block 2 has two side faces between its top and lower faces. The face 17 here extends at an angle to the upper face of the optical block 2.

In the present case, the illumination system 8 is materially arranged outside the optical block 2 behind said face 17 so that the light beam it generates is directly oriented towards the face 17. Moreover, the illumination axis 9 is inclined with respect to the face 17 (the light rays, forming the light beam, are then refracted by said face 17) or orthogonal to said face 17.

As a result, a light beam propagating along the illumination axis 9, then propagates in the optical block 2 to form a given incident ray 14 at the acquisition surface 3 which is not coincident with the illumination axis 9. The given incident ray 14 forms an angle $\alpha$ with the normal 13.

The given incident ray 14 reflects off the acquisition surface 3, thus defining a given reflected ray 15. The illumination system 8 and the optical acquisition system 4 are furthermore arranged so that an angle $\Omega$ between the given reflected ray 15 and the first beam 18 is strictly greater than the angle $\beta$.

In this case the angle $\Omega$ is greater than 60 degrees and is here greater than 70 degrees and is here greater than 90 degrees. The angle $\Omega$ is, for example, 101 degrees.

In this case, the angle $\Omega$ is greater than $2\beta$. $\beta$ is indeed equal to 45 degrees in this case.

The illumination system 8 is arranged close to the optical acquisition system 4.

The illumination system 8 is arranged above the optical acquisition system 4. The illumination system 8 is therefore not oriented towards the optical acquisition system 4.

Optionally, the illumination system 8 and the optical acquisition system are arranged so that an angle $\gamma$ between the first ray 18 and the given incident ray is strictly less than 3.

Optionally the angle $\gamma$ is less than 35 degrees and preferably less than 25 degrees. In this case, for example, $\gamma$ is considered equal to 11 degrees (a being equal to 56 degrees).

The illumination system 8 is here arranged so that the angle $\alpha$ is greater than the angle $\beta$.

The illumination system 8 is thus arranged here so that the angle $\alpha$ is greater than the critical angle $\theta_c$ (but of course remains less than the limit angle $\theta_l$).

Furthermore, the optical block 2 comprises at least one zone 10 treated to absorb light rays emitted by the illumination system 8 and reflected at the acquisition surface 3.

For example, said zone 10 is covered with a coating (directly by being molded-in, and/or indirectly by covering an external and/or internal side of at least one portion of at least one of the faces of the optical block 2: the treated zone 10 can thus be arranged outside and/or inside the optical block 2) absorbing at least 95% of the light rays, and preferably at least 98% of the light rays, arriving on the said zone. The coating is for example a dark-colored coating (i.e. a colored coating absorbing at least 95% of the rays, and preferably at least 98% of the rays) and for example black in color.

Optionally, said zone 10 is arranged on at least one of the side faces of the optical block 2 and preferably here the side face opposite the exit face 5 and the face 17 (on this side of the optical block 2, the optical block 2 thus comprises only one side face connecting the upper face and the lower face, said face extending orthogonally to the upper face and the lower face). Preferably said zone 10 extends over at least the entirety of said opposite side face.

The illumination system 8 is arranged so that all the rays emitted by the illumination system 8 and reflected on the acquisition surface 3, reach the zone 10 after any number of reflections on the faces of the optical block 2.

Thus, a device 1 has been described that has an angle $\Omega$ of 101°. For example, for an anisotropy factor g of 0.7, the attenuation is 10 times greater with the device 1 than with the background art device shown in FIG. 1.

FIG. 8 shows a seventh embodiment which is identical to that of FIG. 7 except that the illumination system 8 is cleverly arranged so that its illumination axis 9 is parallel to the optical axis 6.

Preferably, the illumination system 8 and the optical acquisition system 4 are further arranged so that their respective bases lie in the same plane.

Typically, the illumination system 8 and the optical acquisition system 4 are mounted on the same support or on two separate supports that are parallel to each other and optionally extend in the same plane.

The rest of what has been said for the sixth embodiment is therefore also applicable to the seventh embodiment in particular with respect to the angles $\alpha$, $\beta$, $\gamma$ and $\Omega$.

Of course, the invention is not limited to the embodiments described, but encompasses any variant falling within the scope of the invention as defined by the claims.

The device may thus comprise an optical block with a different shape than that described as a prism-shaped optical block but with a different number of side faces. The optical block can be shaped differently, and may for example not be transparent through its entire volume. The optical block will of course be shaped to allow a light path from the illumination system to the optical acquisition system through said block and in particular the acquisition surface.

The illumination system can be arranged next to the optical system, below or above the optical system, between the optical acquisition system and the acquisition system . . . . The illumination system and/or the optical acquisition system can be carried by a printed circuit board and possibly by the same printed circuit board.

Optionally, the illumination system will be arranged so that its illumination axis is parallel or coincident with the optical axis of the optical system.

The illumination system may be different from what has been indicated. For example, the illumination system may comprise a plurality of light sources, the light source may comprise several LEDs, the illumination system may comprise or be associated with one or several backlighting means . . . . In the case where the illumination system comprises several light sources, and for example several LEDs, the said sources will preferably be arranged so as to have all their illumination axes parallel to each other (the illumination system will then have a general illumination axis parallel to each of the said illumination axes of each of the sources). More preferably, the sources will all be arranged in the same plane. For example the sources can be mounted on the same support such as a printed circuit board. The illumination system may include a light guide.

The zone treated to absorb the light rays emitted by the illumination system 8 and reflected at the acquisition surface 3 may not be carried by the optical block but for example carried by another element of the device such as the frame as shown in FIG. 4. It is of course understood that this aspect can be applied to the other embodiments as well as the optical block of the third embodiment can carry said treated zone.

The device may have no frame or a different frame than indicated. For example, the entire upper surface of the optical block can form the entire acquisition surface.

Of course, the device can be configured so that the first ray is reflected a different number of times than shown before reaching the optical acquisition system and/or so that the ray propagating along the illumination axis is reflected a different number of times than shown before reaching the acquisition surface.

The illumination system may be arranged differently from what has been indicated. For example, with reference to FIG. 2, the illumination system could be arranged symmetrically with respect to the optical axis.

Of course, it is possible to combine one or more of the described embodiments.

The invention claimed is:

1. A biometric capture device comprising:
   an optical block integrating an acquisition surface on which a user, when the surface is in use, places at least one body part bearing at least one print,
   an optical acquisition system configured to acquire at least one image of at least one print of said body part through at least one face of the block known as the exit face, the optical acquisition system being arranged so that a first light ray propagating, outside the optical block, along an optical axis of the said optical acquisition system forms at the level of the acquisition surface, an angle $\beta$ with respect to a normal to the acquisition surface of a value greater than a critical angle depending on the refractive indices of the optical block and of the air, the optical system also being arranged so that the optical axis forms an angle with respect to a normal to the exit face smaller than said critical angle,
   an illumination system configured to provide illumination of the acquisition surface, the illumination system generating a light beam defined by an illumination axis,
   a second light ray propagating along the illumination axis out of the optical block, then propagates in the optical block to form a given incident ray at the level of the acquisition surface, and that given incident ray is reflected on the acquisition surface to thus define a given reflected ray,
   the illumination system and the optical acquisition system being arranged so that an angle $\Omega$ between:
   the given reflected ray, if the given reflected ray belongs to a plane defined by the normal to the acquisition surface and the first ray, or the projection of the reflected ray in said plane in the opposite case, and
   the first ray
   is strictly greater than the angle $\beta$.

2. The device according to claim 1, wherein the illumination system illuminates through a face of the optical block adjacent to the exit face.

3. The device according to claim 1, wherein the optical acquisition system is arranged so that its optical axis forms an angle of less than two degrees with respect to the normal to the exit face.

4. The device according claim 1, wherein the angle $\Omega$ is greater than 60 degrees.

5. The device according to claim 1, wherein the angle $\Omega$ is less than $2\beta$ degrees.

6. The device according to claim 1, wherein the illumination system and the optical acquisition system are arranged such that an angle $\gamma$ between the first ray and the given incident ray is strictly less than $\beta$.

7. The device according to claim 6, wherein the angle $\gamma$ is greater than 35 degrees.

8. The device according to claim 1, wherein the angle between the given incident ray and the normal to the acquisition surface is greater than $\beta$.

9. The device according to claim 1, comprising a single illumination system and/or a single optical acquisition system.

10. The device according to claim 1, wherein the illumination system and the optical acquisition system are carried by supports extending in coincident or parallel planes.

11. The device according to claim 1, wherein the optical block is shaped like a prism.

12. The device according to claim 1, wherein the optical block is shaped like a blade:
    with parallel faces, with one side face inclined at least partially or
    thin, with a plurality of micro-prisms on the bottom side.

13. The device according to claim 1, comprising at least one zone treated to absorb light rays emitted by the illumination system and reflected at the acquisition surface.

14. The device according to claim 13, wherein said zone is treated by being covered with a dark colored coating.

15. The device according to claim 1, wherein the optical acquisition system and the illumination system are close to one another.

* * * * *